(12) United States Patent
Marston

(10) Patent No.: US 8,328,168 B1
(45) Date of Patent: Dec. 11, 2012

(54) SUBMERGED AERATOR

(75) Inventor: Michael D. Marston, South Bend, IN (US)

(73) Assignee: AK Industries, Plymouth, IN (US)

( * ) Notice: Subject to any disclaimer, the term of this patent is extended or adjusted under 35 U.S.C. 154(b) by 411 days.

(21) Appl. No.: 12/781,369

(22) Filed: May 17, 2010

(51) Int. Cl.
*B01F 3/04* (2006.01)

(52) U.S. Cl. .................................. 261/121.1; 261/122.1

(58) Field of Classification Search ............... 261/121.1, 261/122.1
See application file for complete search history.

(56) References Cited

U.S. PATENT DOCUMENTS 5,266,239 A   11/1993  Drewery
5,458,816 A * 10/1995  Ebner et al. .................. 261/64.1
6,096,203 A    8/2000  Drewery

* cited by examiner

*Primary Examiner* — Robert A Hopkins
(74) *Attorney, Agent, or Firm* — Botkin & Hall, LLP

(57) ABSTRACT

An aerator particularly useful in the aeration of waste treatment systems. The aerator has a hollow support pipe communicating air to arms having diffuser stones, the support pipe extending upwardly from a weighted base. The diffuser stones are near the ends of the arms. A first pair of arms is lower than a second pair of arms and each pair of arms has a common axis. The axes of the arms are angled relative to each other. The diffusers on the lower pair of arms are angled upward and the diffusers on the upper arms are angled downward. The aerator provides a large projected area for the diffusers as viewed from above, and spreads air bubbles laterally away from the aerator. The aerator of the present invention keeps the diffusers above the bottom at an optimized height while maximizing aeration.

10 Claims, 5 Drawing Sheets

US 8,328,168 B1

SUBMERGED AERATOR

BACKGROUND OF THE INVENTION

Aerators for waste treatment systems must be designed to optimize multiple tradeoffs, to provide the best aeration at the lowest cost, with the least maintenance. Ideally, a small number of aerators would provide a large area of bubbles to contact as much water as possible in the waste treatment system. More aerators increases costs of the system due to the cost of the aerators themselves and the piping to supply air to them, so the least number aerators to achieve a high level of aeration is desirable.

Treatment of wastewater is more effective when air bubbles make contact with as much water in the system as possible. In order to contact as much of the water in the treatment system as possible, the aerators should be placed as near the bottom as possible so that the air can percolate upwardly through the most water possible. However, if the aerators are placed too near the bottom, sediment in the water may clog the porous diffuser stones that are typically used in aerators. Thus, the stones should be placed at a height that keeps the stones out of sediment, but still near the bottom of the tank of the treatment system.

Maximizing the bubbles' contact with water also means that the projected area of the diffusers, as viewed from above the aerators, should be as large as possible. The larger the cloud of bubbles emanating from the aerator, the more water will be in contact with bubbles from the aerator. If for instance, multiple diffuser stones are placed vertically directly above one another, the projected area of the diffusers as viewed from above will be much less than if the stones are spread apart. The larger the projected area viewed from above is, the larger the cloud of bubbles will be that percolates upward through the water.

SUMMARY OF THE INVENTION

The present invention is an aerator particularly useful in the aeration of waste treatment systems. The aerator has a hollow support pipe that extends upwardly from a weighted base. The support pipe includes an inlet for receiving and communicating air. A first pair of arms are hollow and in communication with the support pipe. The first pair of arms extend laterally from the support pipe and have a first axis. The first pair of arms has a diffuser near each end for diffusing pressurized air communicated through the first pair of arms. A second pair of arms are hollow and in communication with the support pipe. The second pair of arms extend laterally from the support pipe and have a second axis. The second pair of arms have a diffuser near each end for diffusing pressurized air communicated through the second pair of arms. The first and second axes of the arms are angled relative to each other.

In another aspect of the invention, the diffusers on one pair of arms are angled upwardly and the diffusers on the other pair of arms are angled downwardly.

In another aspect of the invention a pair of upper arms is above another pair of lower arms, the upper arms having their diffusers angled downward, and the lower arms having their diffusers angled upward.

The diffusers may be porous stones that are air permeable.

DETAILED DESCRIPTION OF INVENTION

Figure 3:
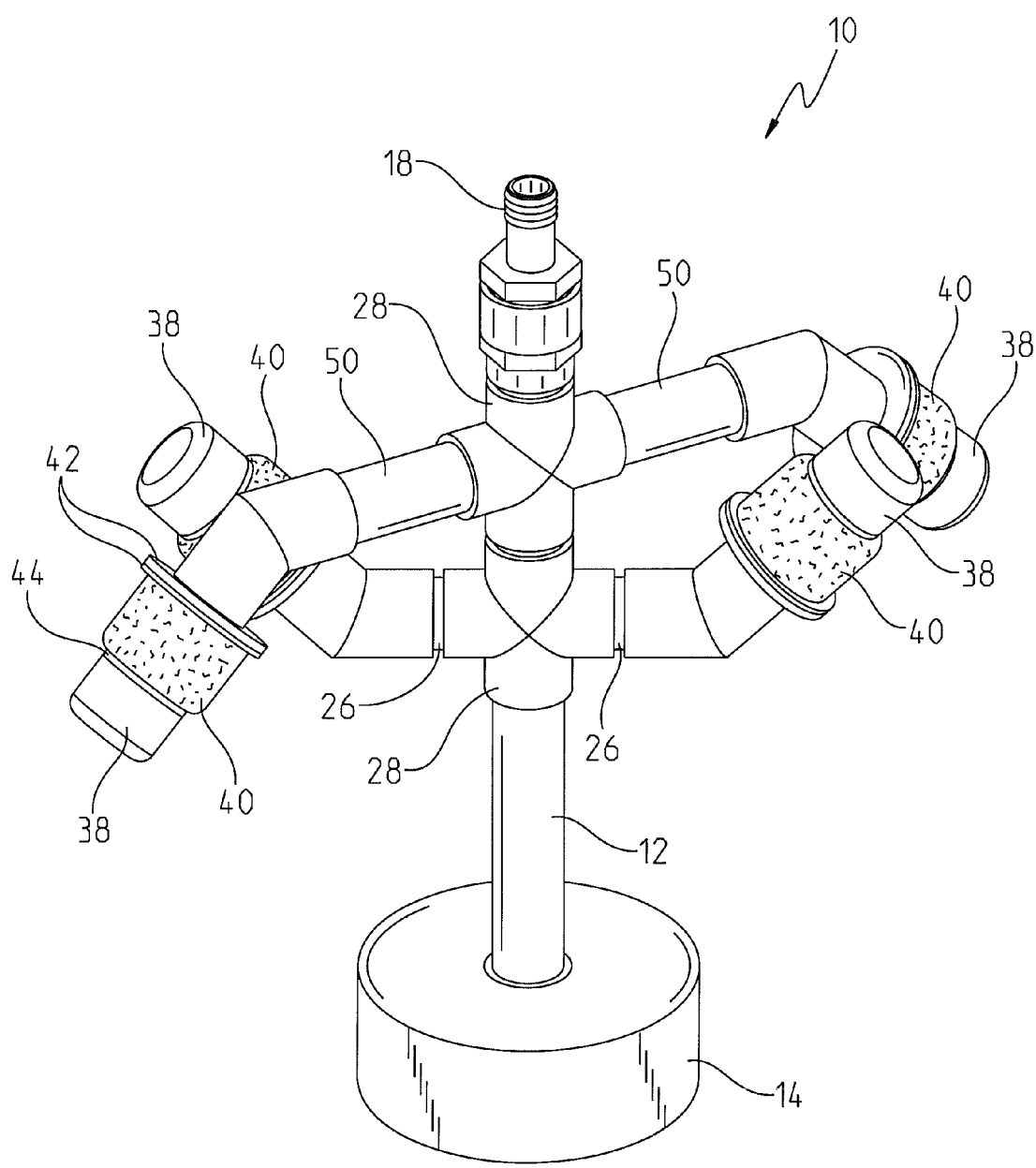
FIG. 3 is a perspective view of the aerator shown in FIG. 1.

The present invention is an aerator 10 that is particularly useful in a wastewater treatment system. The aerator has a hollow support pipe 12 that extends vertically from a weighted base 14. FIG. 3 shows a perspective view of the aerator 10. The weighted base 14 may be made of epoxy or any other material that is dense enough to prevent the aerator 10 from floating upward in water. The hollow support pipe 12 has an inlet 18 at the top end that is designed to be connected to a flexible air hose (not shown). The lower end of the support pipe 12 has an end cap or plug 20 that prevents air from exiting the bottom of the support pipe 12. The support pipe 12 is made from readily available PVC pipe, as are the other pipe pieces of the aerator 10.

Figure 4:
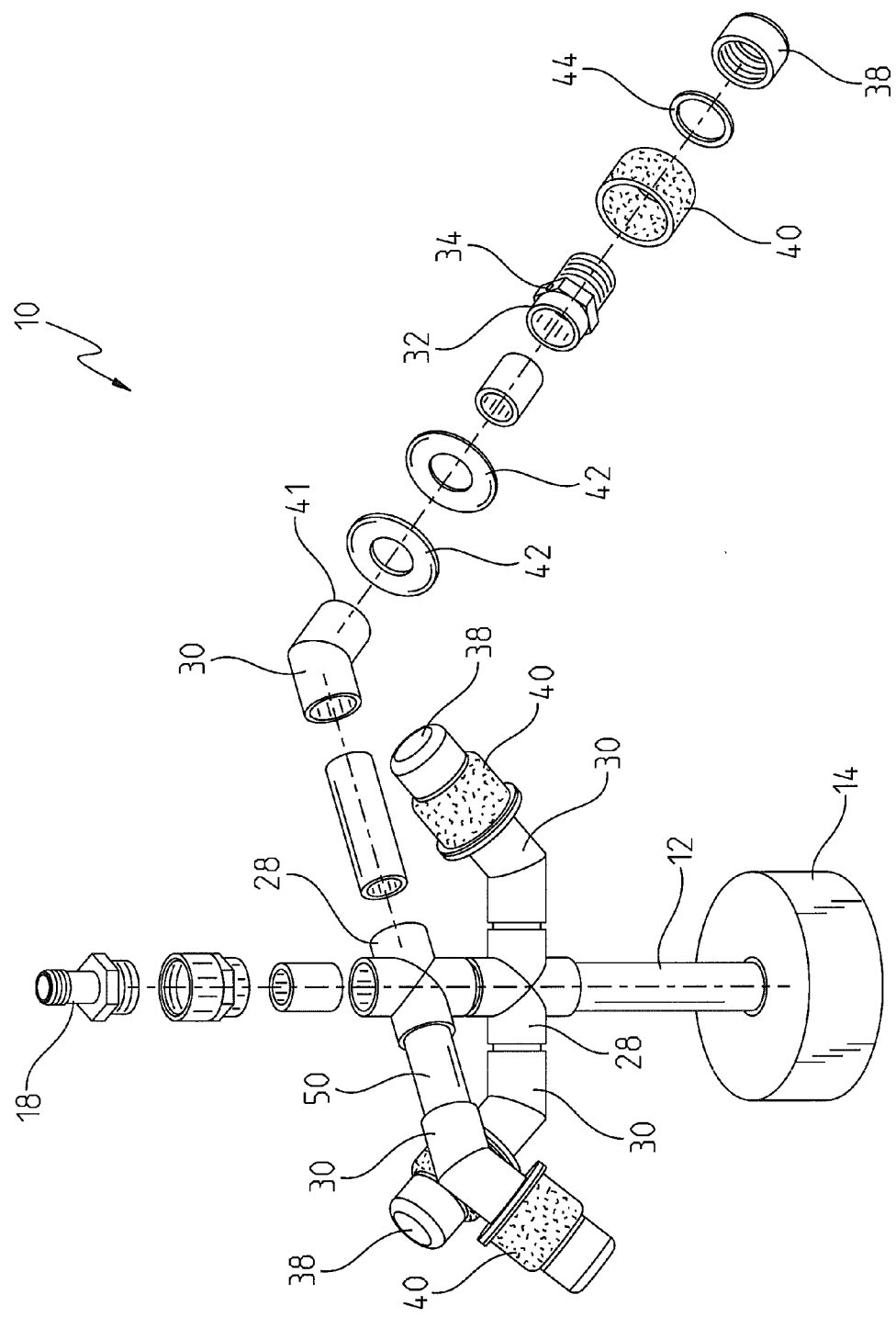
FIG. 4 is an exploded view of the aerator shown in FIG. 1.
Figure 5:
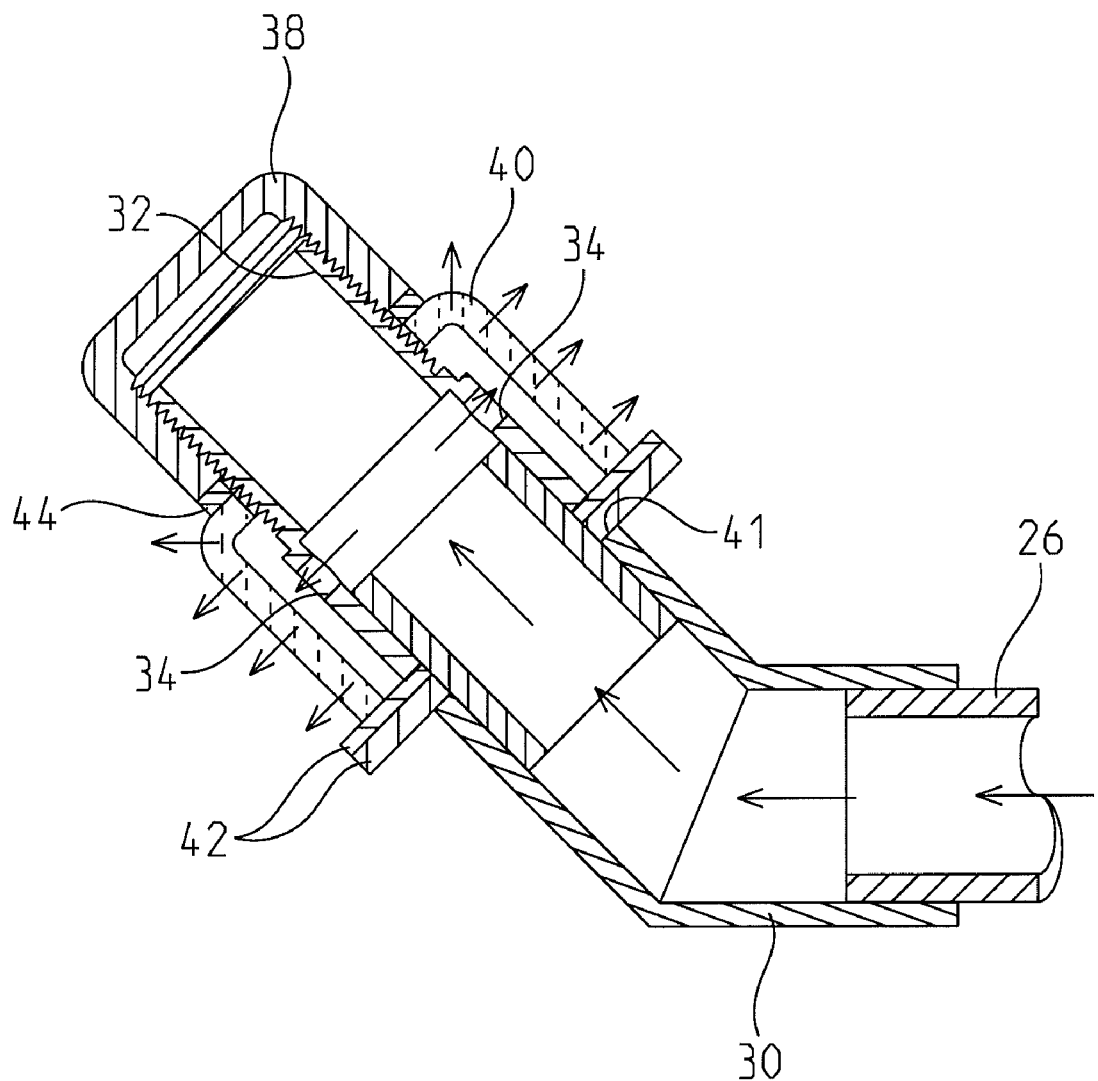
FIG. 5 is a magnified sectional view of a diffuser showing area 5 in FIG. 2.

Above the base 14 a first pair of arms 26 extends laterally from the support pipe 10. The arms 26 are joined to the support pipe 12 with a cross pipe coupler 28 that communicates the inside of the support pipe 10 to the insides of the arms 26. The arms 26 have a common first axis 27 that is perpendicular to the support pipe 10. The first arms have 45 degree elbow pieces 30 turned upward. A threaded adapter 32 is glued into the ends of the 45 degree elbow pieces 30. The threaded adapter 32 includes holes 34 that can be seen in FIG. 4, and more clearly in FIG. 5. A cap 38 is threaded onto the end of the adapter 32. The cap 38 ensures that all air that enters the arms 26 must exit through the holes 34. A porous air permeable diffuser stone 40 is placed between a shoulder 41 of the 45 degree elbow 30 and the cap 38. Lower washers 42 and an upper washer seal 44 provide a sealed connection between the shoulder 41 of the elbow 30 and the cap 38 respectively. Thus, all air entering an arm 26 is forced out of the diffuser stone 40.

Figure 1:
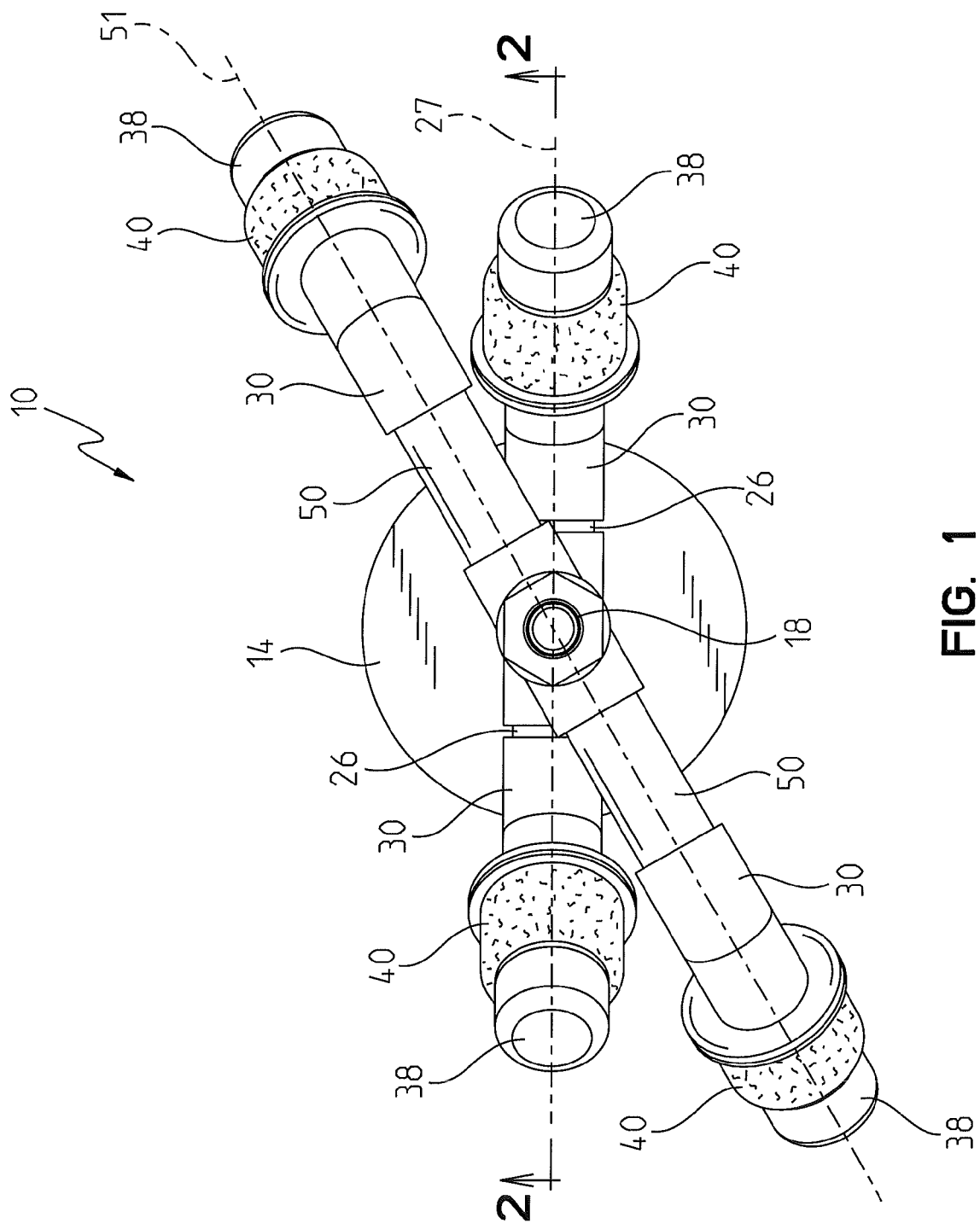
FIG. 1 top view of the aerator.
Figure 2:
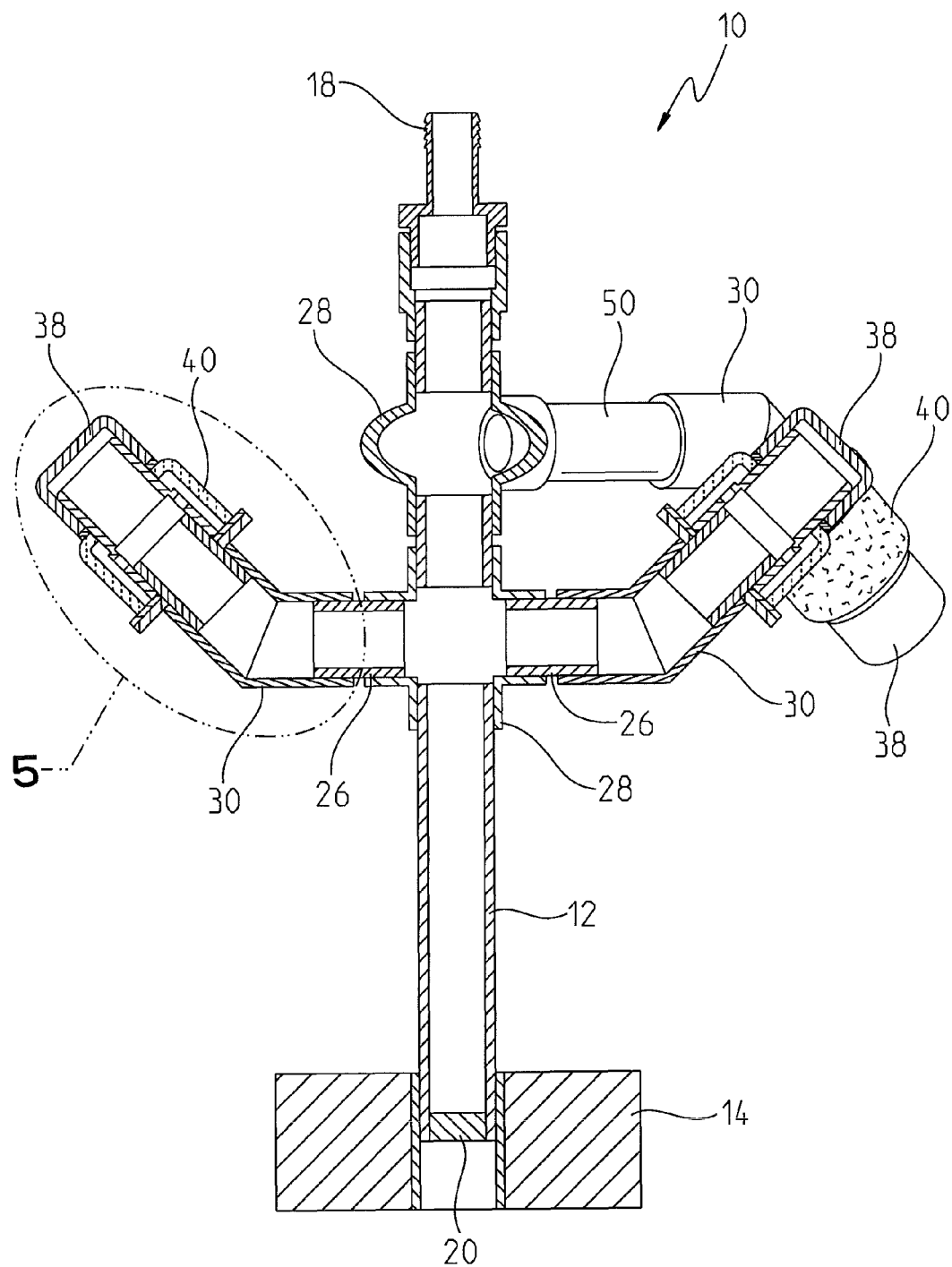
FIG. 2 is a sectional view taken about the line 2-2 in FIG. 1.

Above the first pair of arms 26 is a second pair of arms 50. The second upper pair of arms 50 is assembled in the same manner as the first lower pair of arms 26, but is slightly longer, and have their elbows 30 turned downward. A second axis 51 of the second pair of arms 50 is perpendicular to the support pipe 12 and angled relative to the first axis 27. The angle between the first and second axes 27, 51 is an acute angle as shown in the FIG. 1, however 90 degrees could also be used. The angles of the diffuser stones 40 being 45 degrees from horizontal encourages the bubbles to be diffused laterally outward from the arms 26, 50 and still provides a relatively large projected area of the stones 40 as viewed from above. FIG. 1 shows the stones 40, as viewed from above. Having a relatively large projected area, as viewed from above, is important because ideally in a wastewater treatment system it is desirable to have a large well-dispersed cloud of bubbles emanating from the diffuser to maximize the area of water aerated. The better the aeration, the better the wastewater will be treated. Thus, more aerated area means better wastewater treatment.

The positioning of the ends of the arms is important to the functioning of the aerator as well. To maximize the aeration of the wastewater in the tank, the air bubbles emanating from the diffuser should originate from as near the bottom of the tank as possible. This would maximize the distance the bubbles travel through the water and maximize the water contacted by the air bubbles. However, if the diffuser stones 40 are placed at the bottom of the wastewater tank, it is likely the pores in stones 40 will become clogged by sediment. To prevent clogging of the stones 40, they are elevated from the bottom of the tank. In the present invention, the stones 40 are elevated from the bottom of the tank (elevated above the base 14) by the length of the support pipe 12. The first arms 26 are above the base 14 by the minimum amount to prevent sediment clogging of the stones 40 yet still provide a maximum amount of upward travel for the air bubbles. However, the construction of the aerator 10 using standard cross pipe couplers 28 would elevate the second pair of arms 50 above the first pair of arms 26 by at least the distance between the centers of the cross pipe couplers 28. To hold the stones 40 on the upper pair of arms 50 downward into the optimum lowest possible position, the 45 degree elbows 30 are angled downward on the second pair of arms 50 so that the centers of the stones 40 are in the same plane as the stones 40 on the lower pair of arms 26. Thus, readily available standard plumbing parts may still be used to construct the aerator 10 having optimal stone placement. Also, having the stones 40 on both pairs of arms 26, 50 angled at 45 degrees provides a similar large projected area as viewed from above for all the stones 40, which is evident in FIG. 1. The 45 degree angle of the elbows 30 helps provide some outward lateral movement of the bubbles so that the cloud of bubbles emanating from the stones 40 extends outwardly from the aerator 10 and further maximizes the amount of water contacted by air bubbles.

In a waste treatment application, the aerator 10 will be connected to a flexible air hose at the inlet 18 by pushing the inlet 18 into the air hose. The aerator 10 will be lowered into the waste treatment tank by the flexible air hose, and the weighted base 14 will keep the aerator 10 submerged where it was initially lowered. Although the aerator stones 40 are held above the bottom of a tank into which the aerator 10 is placed, the stones 40 may need to be changed if they become clogged. This is accomplished by loosening the threaded cap 38 from the top of the stone 40, removing the stone 40, then replacing the stone 40 with a new one. After changing the stone, the cap 38 is tightened to compress the upper washer 44 against the stone 40.

The present invention is not limited to the details given above, but may be modified within the scope of the following claims.

What is claimed is:

1. An aerator comprising:
   a weighted base;
   a hollow support pipe extending upward from said weighted base; said support pipe including an inlet for receiving and communicating air;
   a first pair of arms, said arms being hollow and in communication with said support pipe, said first pair of arms extending laterally from said support pipe and having a first axis, said first pair of arms having a diffuser near each end for diffusing pressurized air communicated through said first pair of arms; and
   a second pair of arms, said arms being hollow and in communication with said support pipe, said second pair of arms extending laterally from said support pipe and having a second axis, said arms having a diffuser near each end for diffusing pressurized air communicated through said second pair of arms, said first and second axes being angled relative to each other.

2. An aerator as claimed in claim 1, wherein said diffusers on one of said pair of arms are angled upward and the diffusers on said other pair of arms is angled downward.

3. An aerator as claimed in claim 2, wherein said diffusers are porous stones that are air permeable.

4. An aerator as claimed in claim 2, wherein said diffusers are substantially co-planar.

5. An aerator as claimed in claim 4, wherein said diffusers are porous stones that are air permeable.

6. An aerator comprising:
   a weighted base;
   a hollow support pipe extending upward from said weighted base, said support pipe including an inlet for receiving and communicating air;
   a lower pair of arms being hollow and in communication with said support pipe, said lower arms extending laterally from said support pipe and having a common first axis substantially perpendicular to said support pipe, said lower arms each having a diffuser near each end for diffusing pressurized air communicated through said lower arms, said diffusers angled upward from said lower arms; and
   an upper pair of arms located above said lower pair of arms and extending laterally from said support pipe having a common second axis substantially perpendicular to said support pipe, said upper arms being hollow and in communication with said support pipe, said upper arms each having a diffuser near each end for diffusing pressurized air communicated through said upper arms, said diffusers angled downward from said upper arms, said first and second axes angled relative to each other.

7. An aerator as claimed in claim 6, wherein said diffusers on said lower arms are held above where said lower arms join said support pipe and said diffusers on said upper arms are held below where said upper arms join said support pipe.

8. An aerator as claimed in claim 7, wherein said diffusers are porous stones that are air permeable.

9. An aerator as claimed in claim 8, wherein said diffusers are substantially co-planar.

10. An aerator as claimed in claim 9, including at least four diffusers.

* * * * *